United States Patent [19]

Legg

[11] Patent Number: 5,078,658
[45] Date of Patent: Jan. 7, 1992

[54] FRICTION DRIVE MECHANISM

[76] Inventor: Charles W. Legg, 18655 Clark St. #204, Tarzana, Calif. 91356

[21] Appl. No.: 568,162

[22] Filed: Aug. 16, 1990

[51] Int. Cl.[5] .............................................. F16H 1/00
[52] U.S. Cl. ................................................... 474/148
[58] Field of Search ............................... 474/148-150, 474/239, 167, 174

[56] References Cited

U.S. PATENT DOCUMENTS 2,274,512  2/1942  Weimer ................................ 474/148
2,647,409  8/1953  Keim ................................ 474/148 X
3,364,765  1/1968  Andrews ............................ 474/148

Primary Examiner—Thuy M. Bui
Attorney, Agent, or Firm—Allan M. Shapiro

[57] ABSTRACT

The friction drive mechanism has first and second wheels with at least one resilient elastomeric friction ring (O-ring) resiliently engaging on the outer peripheral surface of one of the wheels and against the surface of or against another such ring on the surface of the other wheel. The rings are radially compressed, but axially free. Rotation of the driving wheel causes rotation of the driven wheel through frictional engagement of the resilient elastomeric ring.

18 Claims, 1 Drawing Sheet

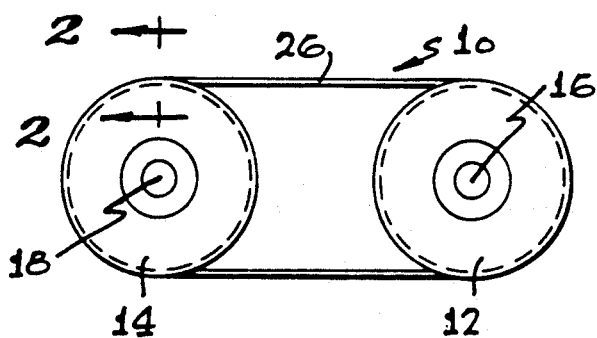
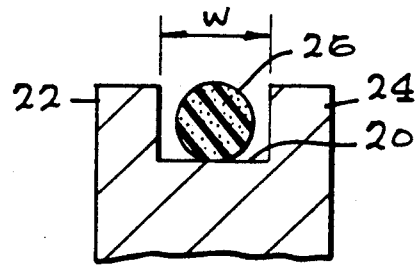
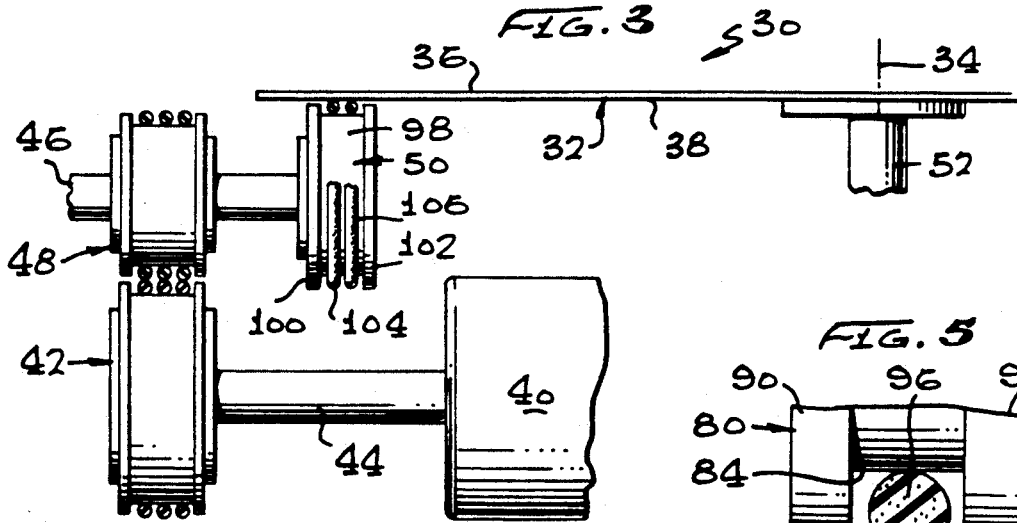
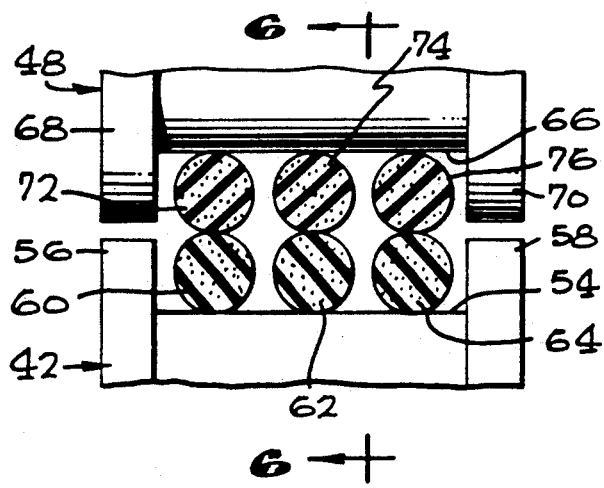
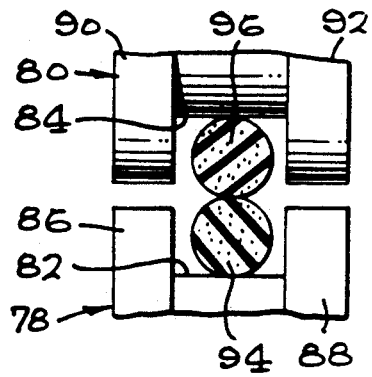
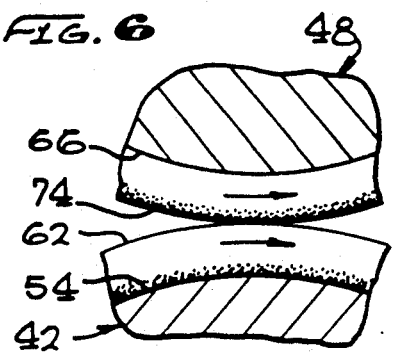

FRICTION DRIVE MECHANISM

FIELD OF THE INVENTION

This invention is directed to a friction drive mechanism wherein a driving wheel is frictionally coupled to a driven wheel through at least one resilient elastomeric band of circular section which is resiliently engaged around the periphery of one of the wheels and frictionally engaging the other.

BACKGROUND OF THE INVENTION

In most machinery, the prime mover is separate from the ultimate device to be driven and, consequently, an interconnecting drive mechanism is employed. In some cases, belts are employed. Historically, belt drives started with flat belts. Belting with a circular section is often employed for low power applications. The low power applications were such that the belt of circular section could be cut from a single thickness of leather. As synthetic material was developed, both flat and round belts continued in use. However, the V-belt was developed wherein the force normal to the surface was greater than the radial belt force to result in a high friction installation without great belt tension. Round belts were sometimes used in V-belt sheaves where they were axially constrained. The round belts were also used in belt drive applications wherein the sheave was in half circular section with a belt groove equal to the round belt dimension. In such cases, the belt is axially constrained. The axial constraint of resilient elastomeric rings is illustrated in Davy U.S. Pat. No. 607,986 and Hamilton U.S. Pat. No. 3,094,006. The teaching in belt drives has been to axially constrain the belt.

A particular example of an apparatus in which the friction drive mechanism of this invention can be installed is a movie film transport system. A commercially available 35-millimeter movie film transport system operates with a large disc rotating on a vertical axis. In such an orientation, a long strip of film can be wound to present a long (for example, five hours) viewing program. In the takeup of film, the actual rotative speed of the takeup roller is controlled by the rate of supply of film from the projector. As the film winds, its winding diameter increases so that slower rotation gives constant peripheral winding speed. A friction drive is employed wherein a flat, resilient elastomeric tire is resiliently engaged on a drive wheel and is frictionally engaged against the bottom of the large platter which is the takeup reel. The problem with these tires is that there is a great deal of wear, which makes for a short life of the drive mechanism, but which also puts a lot of dust into the air. In a movie projection system, dust is objectionable and, as a result, dust in the area is to be avoided. An improvement is needed in such a system.

SUMMARY OF THE INVENTION

In order to aid in the understanding of this invention, it can be stated in essentially summary form that it is directed to a friction drive mechanism which includes a wheel which has an outer surface which is in the shape of a circular cylinder around the axis of rotation. End flanges are axially spaced at each end of the drive surface. At least one resilient elastomeric drive ring of circular section is resiliently engaged on the cylindrical drive surface so that it is radially frictionally engaged and axially free between the end flanges. A second surface engages the resilient drive band to provide interengaging motive forces for driving.

It is thus an object and advantage of this invention to provide a friction drive mechanism which employs axially free and radially engaged drive bands of circular section so that the drive bands can find their optimum drive location to minimize frictional wear and, thus, minimize the need for replacement and the creation of dust in the area.

It is another object and advantage of this invention to provide a friction drive mechanism which is inexpensive, reliable, of long life, and which is an actual improvement in frictional drive structures by providing axial freedom for the drive bands to minimize wear and dust.

It is another object and advantage of this invention to provide a friction drive mechanism which is particularly useful in a movie film transport system wherein the input RPM is constant, but the driven disc RPM varies with the increasing amount of film wound on the disc.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side elevational view of the first preferred embodiment of the friction drive mechanism of this invention.

FIG. 2 is an enlarged section through the periphery of one of the drive wheels, with parts broken away, as seen generally along line 2—2 of FIG. 1.

FIG. 3 is a side elevational view of a portion of a movie film platter transport system showing the mechanism for winding up film as it comes out of the projector.

FIG. 4 is an enlarged view, with parts broken away, showing a portion of the drive mechanism of FIG. 3.

FIG. 5 is a similar view of an alternate embodiment.

FIG. 6 is a section taken generally along line 6—6 of FIG. 4, showing the engagement between two drive bands.

DESCRIPTION OF THE PREFERRED EMBODIMENTS

The first preferred embodiment of the friction drive mechanism is generally indicated at 10 in FIG. 1. It comprises a drive wheel 12 and a driven wheel 14. The drive and driven wheels 12 and 14 are of identical cross section, at least at their periphery, and thus are interchangeable. They relatively rotate around axes 16 and 18. The drive surface 20 is in the form of a right circular cylinder around the axis. The drive surface is axially constrained by flanges 22 and 24, which radially extend outward past the drive surface. Drive band 26 engages on the drive surfaces of both the drive and driven wheels. Drive band 26 is in the form of a resilient elastomeric continuous band of circular section. The circular section is less than the width W between the flanges 22 and 24, as seen in FIG. 2. This permits the drive band to freely roll axially on the drive surfaces as required for minimum stress. The drive band 26 is stretched over the drive and driven wheels to frictionally engage upon their drive surfaces, but the axial freedom permitted the drive band between the flanges permits the drive band to achieve the lowest energy position. This lowest energy position reduces wear on the drive band and, thus, also minimizes the generation of debris from wear. While one drive band 26 is shown, a plurality of drive bands could be provided as long as the width W was greater than the sum of the diameters of all of the drive bands so that the drive bands could each find their own axial position.

The second preferred embodiment of the friction drive mechanism of this invention is generally indicated at 30 in FIG. 3. The mechanism 30 is for the drive of a disc 32. In the preferred example of utilization of the friction drive mechanism, the disc 32 is a platter upon which movie film is wound. The platter 32 rotates around an axis 34. The platter 32 has a top surface 36 upon which the film is wound around the vertical axis 34. The platter 32 also has a drive surface 38 on the lower side of the platter. The prime mover is motor 40. Drive wheel 42 is fixed to motor shaft 44 to be driven by the motor. Counter-shaft 46 carries driven wheel 48 and drive wheel 50. The axis of motor shaft 42 defines the axis of rotation of drive wheel 40, while the axis of rotation of counter-shaft 46 defines the axis of rotation of wheels 48 and 50. The axes of shafts 44 and 46 are parallel to each other and are at a right angle with respect to axis 34. The shafts 44 and 46, as well as the platter shaft 52 on which the platter or disc 32 is mounted are fixed in spaced relationship to each other so that the drive wheel 48 cannot move radially away from the drive wheel 42 and the disc 32 cannot move away from drive wheel 50, all in the radial direction.

Drive wheel 42, particularly see FIG. 4, has a drive surface 54 which is in the shape of a right circular cylinder around the axis of rotation. It has spaced flanges 56 and 58. The flanges are spaced a sufficient distance apart such that one or more drive bands can be fitted between the flanges. The drive bands are of resilient elastomeric material and are of circular section. In FIG. 4, three drive bands 60, 62 and 64 are shown. The drive wheel 48 also has a right circular cylindrical surface 66 which is the driven surface, which is cylindrical about the axis of rotation of shaft 46. Flanges 68 and 70 are spaced to receive drive bands 72, 74 and 76 therebetween.

Since the drive bands on drive wheel 42 engage on the drive bands on drive wheel 48, the axial spacing between the flanges is critical. The spacing between the flanges is such as to permit some axial freedom of the drive bands. However, the drive bands must be sufficiently constrained that some of the drive bands are opposite each other. Thus, the spacing between the flanges is greater than the diameter of the drive band cross sections times the number of drive bands and less than the number of drive bands plus one times the diameter of the drive bands. This is critical because, with a lesser flange spacing, the drive bands would not be free to seek their own lowest stress position, and with a larger spacing, the drive bands would be spaced too far apart so that they could escape engagement. This condition is only true for those cases where two such drive and driven wheels face each other and are in engagement with each other, as illustrated in FIGS. 3, 4 and 5. The maximum width of the groove, between flanges, would not apply in a drive band structure such as shown in FIGS. 1 and 2 and the engagement of drive wheel 50 under the driven surface 38 of platter disc 32.

While three drive bands are shown in FIG. 4, a greater or lesser number may be employed as long as the spacing between flanges is appropriate. For example, in FIG. 5, drive wheel 78 faces driven wheel 80. They respectively have drive and driven surfaces 82 and 84 which are in the shape of a right circular cylinder about their respective axes of rotation. Flanges 86 and 88 define the axial ends of the drive surface 82, while flanges 9 and 92 define the axial end surfaces of driven surface 84. Drive bands 94 and 96 respectively engage upon the surfaces 82 and 84. The drive bands 94 and 96 are each of circular cross section and are formed of resilient, elastomeric rubberlike material the same as the other drive bands, and the drive bands are sufficiently short in length to be stretched onto those surfaces. The flanges are spaced so that the drive bands have a limited amount of axial freedom, as previously described. The drive illustrated in FIG. 5 could be substituted for the drive between wheels 42 and 48 shown in FIG. 3.

Drive wheel 50 has a drive surface 98 which is in the form of a right circular cylindrical surface, the ends of which are defined by flanges 100 and 102. The flanges are spaced so as to receive drive bands 104 and 106 therebetween. The spacing between the flanges is greater than the diameter of the drive bands cross section to permit the drive bands to have freedom therebetween. They are axially unconstrained. The drive bands 104 and 106 are the same as the earlier described drive bands. They are of resilient elastomeric rubberlike material and have a circular cross section. They are stretched onto the drive surface so as to resiliently embrace the surface.

The friction drive mechanism described with respect to FIG. 3 drives the platter disc 32 by the motor 40. It unexpectedly overcomes the previous problems of rapid wear, uneven wear, tire wear, dust products, chatter, and other noise. This friction drive mechanism provides a drive with a long life without uneven drive and without noise. It is believed critical that the drive bands be axially unconstrained within limits so that some axial freedom of motion is achieved to permit the drive bands to reach a minimum stress condition. In each case, the drive bands are radially stressed onto the drive surface and are not completely constrained in the axial direction. An advantageous drive is achieved.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A friction drive mechanism comprising:
   a rigid drive wheel, said drive wheel having an axis of rotation and having an uninterrupted drive surface in the form of a right circular cylindrical surface around said axis, said drive surface having a flange at each axial end thereof, said drive surface being an uninterrupted cylindrical surface between said flanges to define a drive band space therebetween;
   a rigid driven wheel, said driven wheel having an axis of rotation and having a driven surface which is a right circular cylindrical surface about said axis, said surface being axially defined by first and second driven wheel flanges, said driven surface of said driven wheel being an uninterrupted cylindrical surface between said flanges;

at least one drive band engaging in no more than one turn on said surfaces, said drive band being of resilient elastomeric rubberlike material of circular cross section and having a drive band diameter across said circular cross section, the distance between said flanges being sufficiently great so that said at least one drive band is laterally unconstrained in the direction of said wheel axes so that it can reach its lowest energy position.

2. The friction drive mechanism claim 1 wherein said drive band engages in no more than one pass around both said drive wheel and said driven wheel.

3. The friction drive mechanism of claim 2 wherein the distance between said flanges is greater than the number of drive bands times drive band diameter and less than the number of drive bands plus one times drive band diameter.

4. The friction drive mechanism of claim 1 wherein the distance between said flanges is greater than the number of drive bands times drive band diameter and less than the number of drive bands plus one times drive band diameter.

5. The friction drive mechanism of claim 1 wherein said drive band is resiliently engaged around said entire drive surface of said driving wheel.

6. The friction drive mechanism of claim 5 wherein the distance between said flanges is greater than the number of drive bands times drive band diameter and less than the number of drive bands plus one times drive band diameter.

7. The friction drive mechanism of claim 5 wherein said driven wheel also has at least one drive band engaged therearound in resilient contact around the entire circumference of said driven surface of said driven wheel and said flanges on said driven wheel are sufficiently spaced so that said at least one drive band thereon is axially free, said at least one drive band on said drive wheel being in frictional drive contact with said at least one drive band on said driven wheel so as to drive said driven wheel.

8. The friction drive mechanism of claim 7 wherein the distance between said flanges is greater than the number of drive bands times drive band diameter and less than the number of drive bands plus one times drive band diameter.

9. A friction drive mechanism comprising:
a rigid drive wheel and a rigid driven wheel, said drive wheel having an axis and means to rotate said drive wheel about its axis, said driven wheel having an axis, a driven surface on said driven wheel, said driven surface being a surface of revolution about said axis of rotation of said driven wheel;
said drive wheel having a drive surface thereon which is a right circular cylindrical surface about said axis, said drive surface having first and second flanges axially spaced from each other and positioned at a right angle with respect to said axis, said drive surface being an uninterrupted cylindrical surface between said flanges;
at least one drive band, said drive band being a continuous circular resilient elastomeric rubberlike drive band of circular cross section with said circular cross section having a diameter, said drive band being in resilient embrace in no more than one turn on said drive surface of said drive wheel, said flanges being spaced greater than the total diameters of said at least one drive band on said drive surface, said at least one drive band being in driving relationship with said driven wheel.

10. The friction drive mechanism claim 9 wherein there are two drive bands resiliently embraced on said drive surface of said drive wheel and said flanges are spaced greater than two cross-sectional diameters so that both said drive bands are axially free.

11. The friction drive mechanism of claim 10 wherein said flanges on said drive wheel are spaced no more than the total number of drive bands plus one times the cross sectional diameter of said drive bands so that said drive bands can axially move on said drive surface to reach a low energy position.

12. A friction drive mechanism comprising:
a rigid drive wheel and a rigid driven wheel, said drive wheel having an axis and means to rotate said drive wheel about its axis, said driven wheel having an axis, a driven surface on said driven wheel, said driven surface being a surface of revolution about said axis of rotation of said driven wheel, said driven wheel being a disc having an under driving surface and having its axis at a right angle with respect to said axis of said drive wheel;
said drive wheel having a drive surface thereon which is a right circular cylindrical surface about said axis; said drive surface having first and second flanges axially spaced from each other and positioned at a right angle with respect to said axis;
at least two drive bands resiliently embraced on said drive surface of said drive wheel, said drive bands being continuous circular resilient elastomeric rubberlike drive bands of circular cross section with said cross section having a diameter, said drive bands being in resilient embrace on said drive surface of said drive wheel, said flanges being spaced greater than two cross-sectional diameters and no more than a total number of drive bands plus one times the cross-sectional diameters so that said drive bands can axially move on said drive surface to reach a low energy position, said drive bands being in driving relationship with said driven wheel.

13. A friction drive mechanism comprising a motor and a first drive wheel driven by said motor to rotate about an axis, a first driven wheel driven by said first drive wheel;
a second driven wheel, a second drive wheel, said second driven wheel being coaxially mounted with and connected to drive said second drive wheel, said first drive wheel and said second driven wheel each having a surface in the form of an uninterrupted right circular cylindrical surface about its axis of rotation and each of said surfaces being axially limited by flanges, at least one drive band resiliently embracing said surface on said first drive wheel, said drive band being a continuous circular resilient elastomeric rubberlike drive band of circular cross section with said circular cross section having a diameter, said drive band being in resilient embrace in no more than one turn on said drive surface of said first drive wheel, said flanges on said first drive wheel being sufficiently spaced so that said first drive band thereon is axially free;
a driven drive band on said second driven wheel, said driven drive band elastically embracing said surface of said second drive wheel, said flanges on said second driven wheel being spaced sufficiently so that said at least one driven drive band is axially free to reach a low energy position.

14. A friction drive mechanism comprising:
a motor;
a first drive wheel driven by said motor so that said first drive wheel rotates about a first axis, said first drive wheel having a drive surface thereon which is a right circular cylindrical surface, first and second flanges axially spaced on said first drive wheel and at least one resilient drive band resiliently embraced on said drive surface, said drive band having a circular cross section, said flanges being sufficiently spaced so that said drive band is axially free;
a first driven wheel mounted to rotate on an axis, said first driven wheel having a surface which is a right circular cylindrical surface about said axis of rotation of said driven wheel, first and second spaced driven wheel flanges axially limiting said cylindrical surface on said driven wheel, at least one drive band resiliently embracing said driven surface, said drive band having a circular section and said flanges being spaced so that said drive band is axially free;
a second drive wheel mounted to rotate on said axis of rotation of said first driven wheel, said second drive wheel having a surface which is a right circular cylindrical surface of revolution about said axis of rotation, first and second spaced flanges axially defining said second drive surface, at least one resilient drive band resiliently embracing said drive surface of said second drive wheel, said at least one drive band on said second drive wheel being of circular section and said flanges on said second drive wheel being sufficiently spaced so that said at least one drive band is axially free; and
a disc positioned to be frictionally engaged by and rotated by said at least one drive band on said second drive wheel.

15. The friction drive mechanism claim 14 wherein said disc is a takeup disc to receive movie film thereon to be wound thereon.

16. The friction drive mechanism of claim 14 wherein the spacing of said flanges on each of said first and second drive wheels and said first driven wheel is greater than the number of drive bands on each said wheel times the cross-sectional diameter of said drive bands and is less than the number of drive bands thereon plus one times the diameter of each of said drive bands.

17. The friction drive mechanism of claim 14 where each of said resilient drive bands has the same cross-sectional diameter.

18. A rigid wheel for a friction drive mechanism comprising:
a shaft for rotation about an axis, said wheel being mounted on said shaft for rotation about said axis;
a drive surface on said wheel, said drive surface being an uninterrupted right circular cylindrical surface about said axis of rotation;
first and second spaced flanges on said wheel axially limiting said drive surface, said drive surface being an uninterrupted cylindrical surface between said flanges;
at least one resilient drive band resiliently embracing no more than one turn around said drive surface between said flanges, said drive band being of resilient elastomeric material and having a circular cross section, said first and second flanges being spaced apart a greater distance than the cross-sectional diameter of said at least one drive band times the number of drive bands thereon so that said at least one drive band is axially free to reach a low energy position.

* * * * *